United States Patent

Grubb

[11] Patent Number: 5,530,710
[45] Date of Patent: Jun. 25, 1996

[54] HIGH-POWER PUMPING OF THREE-LEVEL OPTICAL FIBER LASER AMPLIFIER

[75] Inventor: Stephen G. Grubb, Warren, N.J.

[73] Assignee: AT&T Corp., Murray Hill, N.J.

[21] Appl. No.: 441,097

[22] Filed: May 15, 1995

[51] Int. Cl.⁶ .................................................. H01S 3/30
[52] U.S. Cl. ............................ 372/6; 385/126; 385/127; 385/27
[58] Field of Search ........................ 385/27, 126, 127, 385/24; 372/6

[56] References Cited

U.S. PATENT DOCUMENTS

| | | | |
|---|---|---|---|
| 4,815,079 | 3/1989 | Snitzer et al. | 385/127 |
| 5,121,460 | 6/1992 | Tumminelli et al. | 385/126 |
| 5,291,501 | 3/1994 | Hanna | 372/6 |
| 5,299,210 | 3/1994 | Snitzer et al. | 372/6 |
| 5,317,576 | 5/1994 | Leonberger et al. | 372/6 |
| 5,319,652 | 6/1994 | Moeller et al. | 372/6 |
| 5,461,692 | 10/1995 | Nagel | 385/27 |
| 5,473,622 | 12/1995 | Grubb | 372/6 |

FOREIGN PATENT DOCUMENTS 1-113708  5/1989  Japan ........................ 385/127

*Primary Examiner*—Rodney B. Bovernick
*Assistant Examiner*—Yisun Song

[57] ABSTRACT

A high-power pumping source for a three-level optical fiber amplifier includes a cladding-pumped four-level fiber laser. The four-level laser converts the high-power output of a diode array into an intense diffraction-limited beam which is utilized to pump an associated three-level laser. In turn, the output of the three-level laser is coupled to the fiber amplifier to supply a high-power pumping signal thereto.

22 Claims, 1 Drawing Sheet

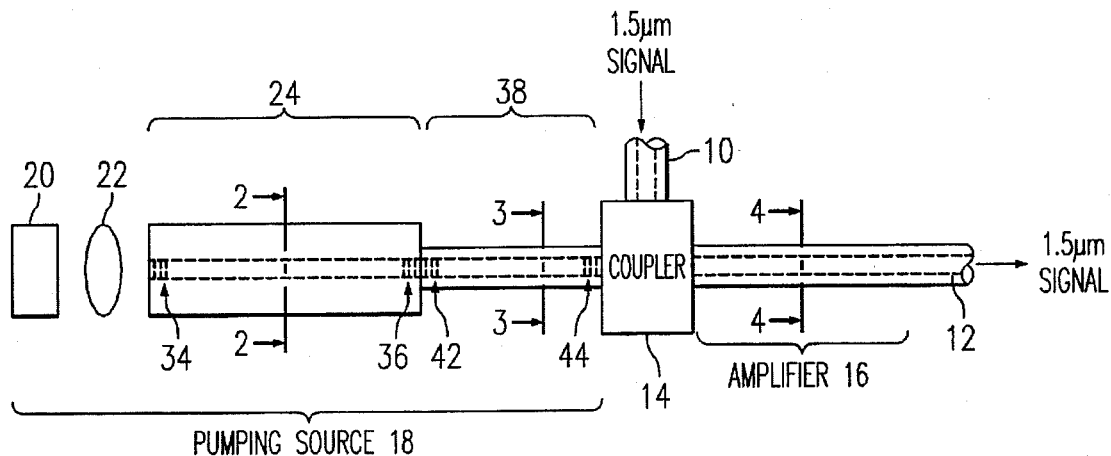
FIG. 1
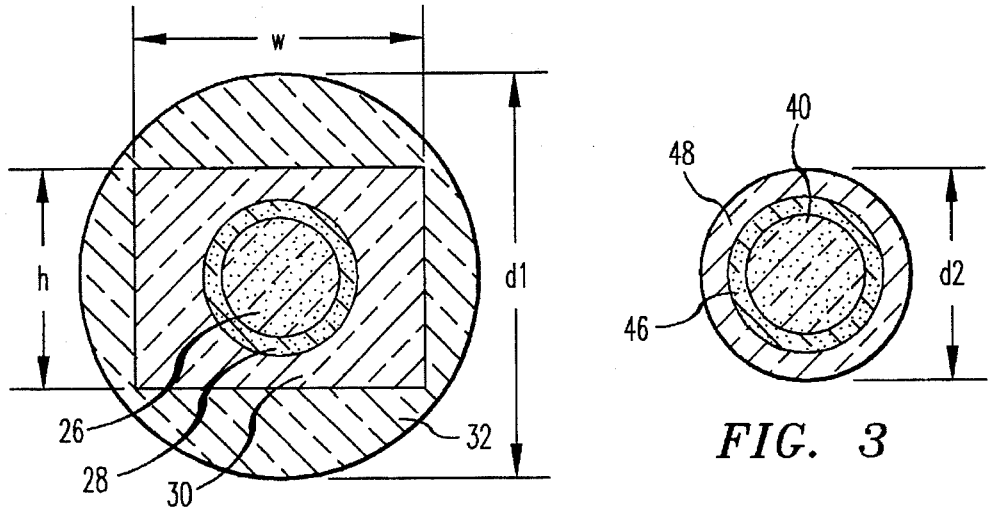
FIG. 2
FIG. 3
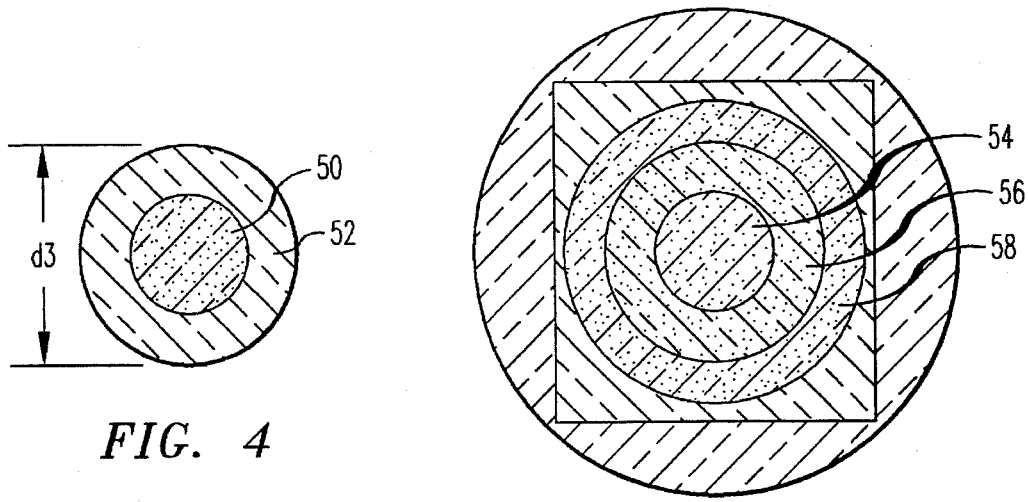
FIG. 4
FIG. 5

HIGH-POWER PUMPING OF THREE-LEVEL OPTICAL FIBER LASER AMPLIFIER

BACKGROUND OF THE INVENTION

This invention relates to optical fiber lasers and, more particularly, to an arrangement for pumping a fiber laser amplifier in a high-power manner.

In the rapidly growing field of optical signal communication systems, fiber lasers of the type that comprise optically transmissive cores doped with rare earth ions (such as ions of neodymium, ytterbium, erbium or thulium) are being increasingly recognized as important components of such systems. Thus, for example, rare-earth optical fiber lasers can be utilized in these systems as optical signal generators, as optical signal amplifiers and as pump lasers for other optical fiber amplifiers.

A particularly advantageous optical fiber laser amplifier suitable for use in practical communication systems comprises a single-mode core doped with erbium (specifically, doped with erbium ions conventionally denoted as $Er^{3+}$). It is well known that such an erbium optical fiber laser operating in its standard so-called three-level mode is capable, when pumped at a wavelength of 980 nanometers (nm), of amplifying optical signals whose wavelength is 1.5 micrometers ($\mu$m). Since 1.5 $\mu$m is the lowest-loss wavelength of conventional single-mode glass fibers, it is apparent that erbium amplifiers are by their nature exceedingly well suited for inclusion in fiber systems that propagate optical signals at 1.5 $\mu$m.

In an attempt to make erbium optical fiber laser amplifiers especially attractive for use in practical communication systems, considerable research and development effort has been directed at trying to increase their gain and output power characteristics. To increase these characteristics, it is necessary to increase the pumping power applied to the erbium amplifier.

Diode lasers are convenient sources for pumping erbium single-mode fiber amplifiers. But the power available in a single-mode beam from a typical diode laser is limited. Much higher power, up to several watts, can be obtained from diode lasers in the form of arrays. But the beam produced by such arrays is highly multimode and not suitable for launching directly into a single-mode core.

A technique commonly referred to as cladding pumping is available for coupling the multimode output of a pumping source comprising a diode laser array into the single-mode core of a fiber laser. In accordance with this known technique, a single-mode core is surrounded by a multimode cladding which in turn is surrounded by an outermost layer. A relatively high-power multimode pumping signal launched into the cladding from a diode array is substantially confined and guided within the cladding. As the pumping light propagates along the cladding, the light crosses over and is absorbed by the single-mode core, thereby supplying pumping power thereto. In that way, absorbed multimode power is converted into a single-mode laser emission within the fiber core. For many applications, this is an effective technique for supplying a relatively high-power pumping signal to a single-mode fiber laser.

In practice, however, cladding pumping is not effective for pumping three-level fiber lasers. Thus, this technique cannot be used to directly pump an important class of devices that includes erbium fiber amplifiers and other three-level fiber lasers.

Accordingly, efforts have continued by workers skilled in the art directed at trying to devise a more effective way of increasing the pumping power available to be delivered to the core of a three-level single-mode fiber amplifier such as an erbium amplifier. It was recognized that such efforts, if successful, could provide a basis for the design of advantageous high-power-output fiber amplifiers suitable for use in optical communication systems.

SUMMARY OF THE INVENTION

In accordance with the principles of the present invention, the high-power output of a conventional diode laser pump array is applied to the multimode cladding of a cladding-pumped four-level fiber laser that includes a single-mode core. In that way, the high-power output of the diode array is converted into an intense diffraction-limited beam in the single-mode core. In turn, the output provided by the four-level fiber laser is utilized as a high-power pumping source for the single-mode core of a three-level fiber laser.

In further accord with the invention, the fiber laser pumped by the diode array comprises a neodymium-doped core and is designed to operate in a four-level mode to provide an output at 940 nm. The high-power output of the neodymium laser is then utilized to pump the single-mode core of a three-level ytterbium laser which is designed to respond thereto to provide an intense output at 980 nm. Subsequently, the output of the ytterbium laser is employed as a high-power pumping source for the single-mode core of a three-level erbium laser amplifier. In that way, the erbium laser is powered to provide a high level of amplification at 1.5 $\mu$m.

In one specific illustrative embodiment of the invention, the cladding-pumped neodymium laser, the ytterbium fiber laser and the erbium fiber laser amplifier are arranged in that order in a serial arrangement.

In another specific embodiment of the invention, the inner portion of the single-mode core of the cladding-pumped laser is doped with ytterbium ions and the outer portion thereof is doped with neodymium ions. The output of the doubly doped core is an intense beam at 980 nm. The beam emanating from the doubly doped core constitutes a pumping signal which is then applied to the core of an erbium laser amplifier.

BRIEF DESCRIPTION OF THE DRAWING

A complete understanding of the present invention and of the above and other features and advantages thereof may be gained from a consideration of the following detailed description presented hereinbelow in connection with the accompanying drawing, not drawn to scale, in which:

FIG. 1 is a simplified schematic representation of a portion of a specific illustrative optical communication system made in accordance with the principles of the present invention;

FIG. 2 is a cross-sectional showing of one of the fiber lasers depicted in FIG. 1, as viewed in the direction of arrows 2 of FIG. 1;

FIG. 3 is a cross-sectional showing of another one of the fiber lasers depicted in FIG. 1, as viewed in the direction of arrows 3 of FIG. 1;

FIG. 4 is a cross-sectional showing of the fiber amplifier depicted in FIG. 1, as viewed in the direction of arrows 4 of FIG. 1;

and FIG. 5 is a cross-sectional representation of a doubly doped fiber laser that is included in another specific illustrative embodiment of the present invention.

DETAILED DESCRIPTION

The optical communication system represented in FIG. 1 includes a conventional single-mode optical fiber 10 made, for example, of doped silica glass. Illustratively, as indicated in FIG. 1, input optical signals each centered at a wavelength of 1.5 μm (which is the lowest-loss wavelength of such conventional fibers) are transmitted over the fiber 10. In accordance with the invention, these signals are propagated to a standard single-mode output optical fiber 12 via a conventional optical coupler 14 and a single-mode fiber section that includes a rare-earth-doped core. This doped fiber section constitutes an optical amplifier 16 for signals at 1.5 μm.

Advantageously, the core of the fiber amplifier 16 of FIG. 1 is doped in standard ways with $Er^{3+}$ ions. It is well known that such an amplifier operates in a three-level mode and, when pumped at 980 nm, can provide amplification at a signal frequency of 1.5 μm. For this reason, erbium fiber lasers are well suited for inclusion in the depicted system to provide amplification and regeneration of the 1.5 μm signals propagated therein.

In accordance with this invention, a high-power pumping signal is applied to the three-level fiber amplifier 16 via the coupler 14. Pumping source 18 depicted in FIG. 1 comprises a specific illustrative way of providing such a high-power signal.

Illustratively, the pumping source 18 shown in FIG. 1 comprises a conventional semiconductor diode laser array 20. By way of a particular example, the array 20 is designed to provide high-power pumping radiation (for example, one-to-three Watts) centered at a wavelength of 808 nm. In turn, this output at 808 nm is, for example, applied via a standard lens 22 to the input end of a cladding-pumped laser whose longitudinal extent (typically, one-to-fifty meters) is indicated by a bracket designated by reference numeral 24. Hereinafter, the cladding-pumped laser itself will be referred to by the reference numeral 24.

The nature of the cladding-pumped laser 24 of FIG. 1 is shown in more detail in the cross-sectional view of FIG. 2. As depicted in FIG. 2, the laser 24 comprises an inner single-mode core 26. Illustratively, the core 26 is made of doped silica glass having an index of refraction of 1.47, has a diameter of about five μm, and is doped with appropriate rare-earth ions. Such rare-earth ions constitute the active elements in the laser and, as such, dictate the output wavelength provided by the laser 24.

Skipping for a moment layer 28 of FIG. 2, the single-mode core 26 is surrounded by a multimode cladding 30 which encompasses the entire longitudinal extent of the core 26. The pumping signal provided by the diode array 20 and the lens 22 is applied to the cladding 30.

The cladding 30 of FIG. 2 is made, for example, of undoped silica and is designed to have an index of refraction of approximately 1.46. In one particular illustrative case, the outline of the cladding 30 is rectangular in cross-section, with an overall width w of about 360 μm and an overall height h of approximately 120 μm.

In turn, the cladding 30 of FIG. 2 is encompassed within a second cladding 32. This second cladding has a circular cross-sectional outline surrounding the cladding 30 and is formed from a suitable polymer such as a fluoropolymer or from a conventional low-index glass. In any case, the index of refraction of the cladding 32 is designed to be about 1.39. Illustratively, the overall diameter d1 of the cladding 32 is approximately 500 μm.

As is well known, a high-power multimode beam supplied by the diode array 20 of FIG. 1 can be launched into the cladding 30 (FIG. 2) of the laser 24 via the lens 22. And, since the respective indices of the claddings 30 and 32 are selected in the particular manner specified above, the multimode pumping signal applied to the cladding 30 is guided therein in the same way that light is guided in a conventional optical fiber. As the guided pumping signal propagates longitudinally in the cladding 30, energy from the multimode signal leaks into the single-mode core 26. In that way, the rare-earth-ion-doped core 26 is in effect pumped by the multimode beam. In time, virtually all of the absorbed multimode power is converted in the core 26 into a single-mode emission therefrom.

It is known that cladding-pumped lasers of the type described above and shown in FIGS. 1 and 2 are effective to achieve high-power pumping of fiber lasers that operate in a four-level mode. But, because of the relatively high ground-state absorption that typically occurs in a three-level mode of operation, the cladding-pumped technique has been determined in practice to be ineffective for pumping three-level fiber lasers.

Accordingly, the aforespecified three-level erbium fiber laser core that constitutes the active element of the amplifier 16 of FIG. 1 cannot itself be directly included in a cladding-pumped structure. Some other way must therefore be devised to supply a high-power pumping signal to the core of such a three-level erbium amplifier. In particular, to achieve high-power amplification at 1.5 μm, a high-power pumping signal at 980 nm must be provided.

Conventional diode laser sources have been employed to supply pumping power directly to the single-mode core of a three-level device such as an erbium fiber amplifier. But in practice the power level of an appropriate pumping signal that can thereby be coupled into such a small-diameter core is limited. As a result, the output power obtainable from such an amplifier pumped in this conventional fashion is, for example, at the most about 100 milliWatts (mW).

An ytterbium fiber laser (specifically, one doped with $Yb^{3+}$ ions) is capable, when pumped at about 940 nm and operated as a three-level laser, of providing a single-mode output signal at about 980 nm. Hence, the output of a $Yb^{3+}$ laser is at the right wavelength to be utilized to pump the single-mode core of an $Er^{3+}$ fiber amplifier. But obtaining sufficient output power from such a three-level $Yb^{3+}$ laser to supply a high-power pumping signal to an $Er^{3+}$ amplifier encounters the same difficulties that exist when trying to pump the three-level $Er^{3+}$ amplifier in standard ways.

In accordance with a unique feature of the principles of the present invention, a cladding-pumped fiber laser pumped by a high-power diode array is designed to provide a high-power single-mode output signal at about 940 nm. In turn, this high-power signal is then directly coupled to the single-mode core of a three-level $Yb^{3+}$ fiber laser. And the high-power output signal of the $Yb^{3+}$ fiber laser is then applied as a pumping signal to the single-mode core of an $Er^{3+}$ fiber amplifier. In that way, significantly enhanced output power levels are obtained from the $Er^{3+}$ amplifier.

In one specific illustrative embodiment of the present invention, the cladding-pumped fiber laser 24 represented in FIG. 1 comprises an $Nd^{3+}$ laser. In particular, the laser 24 is designed to respond to high-power 808-nm radiation provided by the diode array 20 and to operate in a four-level mode to generate an output signal at about 940 nm. Significantly, such a four-level laser is capable of converting the high-power multimode output of the array 20 into an intense diffraction-limited beam at about 940 nm in the single-mode core 26 (FIG. 2) of the $Nd^{3+}$ laser 24.

In accordance with the invention, several techniques are advantageous for stimulating the $Nd^{3+}$ laser 24 to lase at about 940 nm and thereby to emit radiation in an above-ground-level four-level mode of operation. Thus, for example, conventional reflective elements such as Bragg diffraction gratings 34 and 36 (FIG. 1) designed to be reflective at 940 nm are formed at or near the respective ends of the core 26 of the fiber laser 24. As is well known, such gratings can be made by transversely doping spaced-apart portions of the longitudinal core 26 with suitable elements that modify the refractive index of the core.

Illustratively, the left-hand grating 34 represented in FIG. 1 is designed in a straightforward manner to be transmissive to the diode pumping signal at about 808 nm and to be approximately 100 percent reflective to radiation propagating in the core 26 at 940 nm. The right-hand grating 36 is designed in a known way to be less than 100 percent (for example, about 50 percent) reflective at 940 nm, whereby single-mode radiation at 940 nm provided by the laser 24 is emitted from the right-hand or output end of the core thereof.

The gratings 34 and 36 define in effect a resonant cavity at 940 nm. Radiation based on laser transitions between energy levels definitive of emission at 940 nm is thereby favored in the laser 24.

An $Nd^{3+}$ fiber laser is also inherently characterized by a four-level transition that causes laser emission at 1060 nm. To minimize or suppress emission at this wavelength, it is generally advantageous to surround the longitudinal extent of the core 26 of the laser 24 with the layer 28 depicted in FIG. 2. Illustratively, the layer 28 is designed to absorb radiation emanating from undesired competing transitions having wavelengths greater than about 1000 nm. In that way, the output power obtained from the laser 24 in the desired output mode at 940 nm is significantly enhanced.

A suitable material from which to make the absorbing layer 28 is silica glass doped with samarium ions (specifically, with $Sm^{3+}$ ions). The refractive index of the layer 28 is designed to be, for example, about 1.47.

Thus, in accordance with the present invention, the high-power output of the diode array 20 of FIG. 1 is converted by the cladding-pumped laser 24 into an intense diffraction-limited output beam at about 940 nm which emanates from the output end of the single-mode core 26 of the laser 24. This output beam from the core 26 is then coupled to a correspondingly sized single-mode core 40 (FIG. 3) of a three-level laser 38 shown in FIG. 1. By way of example, a high degree of coupling (for example, about 98 percent coupling) is achieved between these cores by cleaving and then fusion splicing them in accordance with techniques well known in the art.

In one specific exemplary embodiment, the 940 nm output of the laser 24 is applied as a high-power pumping signal to the core 40 of a three-level $Yb^{3+}$ laser 38. Illustratively, in one particular case, the output power at 940 nm actually coupled into the core of the laser 38 is about 0.5-to-5.0 Watts.

In response to a pumping signal at 940 nm applied thereto from the cladding-pumped four-level laser 24 (FIG. 1), the $Yb^{3+}$ laser 38 is designed to operate in a three-level mode and to emit a high-power output signal at about 980 nm. In turn, the output of the laser 38 is applied via the coupler 14 to the three-level $Er^{3+}$ fiber amplifier 16 to serve as a high-power pumping signal therefor. In that way, the amplifier 16 is powered to provide relatively high-power amplification of 1.5-μm signals that are propagated from the input fiber 10 to the output fiber 12 via the coupler 14 and the amplifier 16.

Illustratively, as indicated above, the three-level laser 38 comprises a core 40 doped with $Yb^{3+}$ ions. By controlling the laser 38 to emit at about 980 nm, a suitable pumping signal for an erbium amplifier can thereby be provided. But a $Yb^{3+}$ laser is also inherently capable of operating in a four-level mode wherein it emits radiation in the wavelength range of 1060-to-1100 nm. Hence, in accordance with the principles of the present invention, techniques similar to those described above in connection with the laser 24 are advantageously employed in the laser 38 to favor and enhance emission at 980 nm and to eliminate or suppress emission in the range 1060-to-1100 nm. In that way, a high-power output signal, suitable for pumping the erbium amplifier 16 at 980 nm, is obtained from the laser 38.

Thus, for example, conventional reflective elements such as Bragg diffraction gratings 42 and 44 located at or near the respective ends of the core 40 of the fiber laser 38 are designed to be reflective at 980 nm. In particular, the left-hand grating 42 is designed to be transmissive to radiation at 940 nm from the laser 24 and 100 percent reflective to radiation at 980 nm generated by the laser 38. Further, the right-hand grating 44 is designed to be partially transmissive (for example, about 50 percent reflective) to radiation at 980 nm, whereby radiation at 980 nm is emitted from the right-hand end of the laser 38 and applied to the fiber amplifier 16 via the coupler 14.

Additionally, it is generally advantageous to surround the core 40 of the laser 38 with a layer 46 which is designed to absorb radiation emanating from unwanted competing transitions. In that way, the output power obtained from the laser 38 in the desired output mode at 980 nm is significantly enhanced. As before, a suitable material from which to make the absorbing layer 46 is silica glass doped with samarium ions (specifically, with $Sm^{3+}$ ions). For the particular case wherein the refractive index of the core 40 is about 1.47, the refractive index of the layer 46 is also designed to be, for example, approximately 1.47.

Further, as indicated in FIG. 3, the core 40 and the layer 46 of the three-level fiber laser 38 are surrounded by a conventional cladding 48 made of undoped silica. Illustratively, the refractive index of the cladding 48 is about 1.46. The final overall diameter d2 of the resulting single-mode optical fiber represented in FIG. 3 is, for example, about 125 μm.

In one specific illustrative embodiment of the present invention, a three-level laser of the type of the laser 38 described herein is capable of providing an output signal at 980 nm at a power level in the range of 0.5-to-2.0 Watts. Such a relatively high-power signal is then applied via the coupler 14 to pump the amplifier 16. In practice, coupling efficiencies of about 98 percent are typically achieved in a standard optical coupler such as the one designated 14 in FIG. 1. Thus, about 0.5-to-2.0 Watts are thereby delivered to the input or left-hand end of the amplifier 16 to serve as a pumping signal therefor.

In the manner described, a high-power pumping signal at about 980 nm can thus be applied to an $Er^{3+}$ fiber amplifier. The cross-section of a typical such amplifier, which is, for example, about five-to-forty meters long, is depicted in FIG. 4.

Illustratively, the fiber amplifier represented in FIG. 4 includes an $Er^{3+}$-doped core 50 that is about two-to-five μm in diameter and has a refractive index of 1.47. Further, the core 50 is surrounded by a conventional cladding 52 having a refractive index of 1.46. The overall diameter d3 of the FIG. 4 fiber is, for example, about 125 μm.

The output fiber 12 shown in FIG. 1 is a continuation of the fiber section in which the amplifier 16 is formed. The only difference between the amplifier section 16 and the conventional highly-transmissive, but passive, output fiber 12 is that the core 50 of the amplifier 16 is doped with active elements comprising rare-earth ions such as $Er^{3+}$ ions.

In the particular illustrative manner described herein, an $Er^{3+}$ fiber amplifier is pumped in fi high-power way at about 980 nm to provide an output at 1.5 μm. In one specific exemplary case, such an amplifier is capable of providing an output signal at 1.5 μm to the output fiber 12 in the power range of about 250-to-500 mW.

In another embodiment of the principles of the present invention, it is feasible to in effect form both of the fiber lasers 24 and 38 of FIG. 1 in a single compact cladding-pumped fiber structure. A cross-sectional representation of such a cladding-pumped arrangement is shown in FIG. 5.

In FIG. 5, a single-mode composite core of an optical fiber comprises an inner portion 54 and an outer portion 56. Illustratively, the outer portion 56 has a diameter of about 5.0 μm, and the inner portion has a diameter of approximately 2.5 μm. By way of example, the index of refraction of the composite core is about 1.47, and the longitudinal extent of the fiber containing the composite core is in the range of one-to-fifty meters.

In one particular illustrative embodiment, the inner portion 54 of the FIG. 5 core is doped with $Yb^{3+}$ ions, and the outer portion 56 is doped with $Nd^{3+}$ ions. In particular, as in the specific example described above in connection with the embodiment represented in FIGS. 1 through 4, the $Nd^{3+}$-doped outer portion 56 is designed to operate in a four-level mode in which it responds to pumping radiation at about 808 to provide an output emission at about 940 nm. Further, the $Yb^{3+}$-doped inner portion is designed to operate in a three-level mode in which it responds to pumping radiation at about 940 nm from the adjacent $Nd^{3+}$ laser to provide an output emission at about 980 nm. In turn, as before in the embodiment of FIGS. 1 through 4, the 980-nm single-mode output of the $Yb^{3+}$ laser is then applied via the coupler 14 to pump the three-level $Er^{3+}$ fiber amplifier 16.

Advantageously, the composite core of the embodiment depicted in FIG. 5 also includes reflective elements such as Bragg diffraction gratings designed to favor emission in the outer $Nd^{3+}$-doped portion 56 at 940 nm and to favor emission in the inner $Yb^{3+}$-doped portion 54 at 980 nm. Illustratively, for this purpose, gratings reflective at 980 nm are formed near or at the respective ends of the composite core, and gratings reflective at 940 nm (and transmissive at 980 nm) are formed in the composite core nested within the 980-nm gratings.

Also, as in the embodiment of FIGS. 1 through 4, it is advantageous to include in the FIG. 5 embodiment a wavelength-selective absorbing layer. Such a layer, made, for example, of a glass material doped with $Sm^{3+}$ ions, is shown in FIG. 5 wherein it is designated by reference numeral 58. In the same manner described before, such a layer 58 enhances emission at 940 nm in the outer portion 56 and at 980 nm in the inner portion 54 by eliminating or suppressing competing radiative transitions in the composite core having wavelengths greater than about 1000 nm.

Thus, in accordance with the principles of the present invention, the high-power output of a diode array is converted by a four-level fiber laser operating in a cladding-pumped structure into an intense diffraction-limited beam in a single-mode core. In a completely serial embodiment, the resulting beam is then utilized to pump a conventional three-level fiber laser whose output is in turn employed to pump a three-level fiber amplifier. In another embodiment, the four-level and three-level lasers are in effect combined in a single-mode composite core in a cladding-pumped laser. The output of the inner or three-level portion of the composite core is then coupled to the three-level fiber amplifier to serve as a high-power pumping signal therefor.

Finally, it is to be understood that the above-described arrangements are only illustrative of the principles of the present inventiuon. In accordance with these principles, numerous modifications and alternatives may be devised by those skilled in the art without departing from the spirit and scope of the invention.

What is claimed is:

1. An optical communication system comprising
an input fiber for propagating an optical signal,
an output fiber for propagating an optical signal,
a three-level fiber laser amplifier interposed in the path between said input and output fibers for amplifying an optical signal propagated between said input and output fibers,
a three-level fiber laser coupled to said fiber amplifier for supplying a pumping signal to said amplifier,
and a cladding-pumped four-level fiber laser coupled to said three-level laser for supplying a pumping signal to said three-level laser.

2. A system as in claim 1 wherein the signals propagated in said input and output fibers have a wavelength of 1.5 μm.

3. A system as in claim 2 wherein said fiber laser amplifier includes a single-mode core doped with $Er^{3+}$ ions, said amplifier being adapted to respond to pumping radiation at about 980 nm to provide amplification at 1.5 μm.

4. A system as in claim 3 wherein said three-level fiber laser includes a single-mode core doped with $Yb^{3+}$ ions, said three-level laser being adapted to respond to pumping radiation at about 940 nm to provide an output at about 980 nm.

5. A system as in claim 4 wherein said four-level fiber laser includes a single-mode core doped with $Nd^{3+}$ ions, said four-level laser being adapted to respond to pumping radiation at about 808 nm to provide an output at about 940 nm.

6. A system as in claim 5 wherein said four-level fiber laser includes a multimode cladding surrounding the single-mode core of said four-level laser, and an additional cladding surrounding said multimode cladding.

7. A system as in claim 6 further including means for supplying pumping radiation to said four-level laser at about 808 nm.

8. A system as in claim 7 wherein said means for supplying pumping radiation at about 808 nm comprises a diode laser array.

9. A system as in claim 8 further including means for directing the 808-nm output of said diode array into the multimode cladding of said four-level laser.

10. A system as in claim 9 further including means for favoring the 980-nm emission of said three-level laser, and means for suppressing emissions therefrom having wavelengths greater than about 1000 nm.

11. A system as in claim 10 wherein said means for favoring comprises 980-nm-reflective elements formed at or near the respective ends of the single-mode core of said three-level laser.

12. A system as in claim 11 wherein said reflective elements comprise Bragg diffraction gratings.

13. A system as in claim 10 wherein said means for suppressing comprises an absorbing layer surrounding the single-mode core of said three-level laser, said absorbing layer being absorptive of emissions having wavelengths greater than about 1000 nm.

14. A system as in claim 9 still further including means for favoring the 940-nm emission of said four-level laser, and means for suppressing emissions from said four-level laser having wavelengths greater than about 1000 nm.

15. A system as in claim 14 wherein said means for favoring comprises 940-nm-reflective elements formed at or near the respective ends of the single-mode core of said four-level laser.

16. A system as in claim 15 wherein said reflective elements comprise Bragg diffraction gratings.

17. A system as in claim 14 wherein said means for suppressing comprises an absorbing layer surrounding the single-mode core of said four-level laser, said absorbing layer being absorptive of emissions having wavelengths greater than about 1000 nm.

18. A system as in claim 9 wherein the single-mode core of said four-level laser is connected in series with the single-mode core of said three-level laser.

19. A system as in claim 9 wherein the single-mode core of said three-level laser is disposed within and surrounded by the single-mode core of said four-level laser in said cladding-pumped laser, thereby to form a composite single-mode core which responds to a pumping signal at about 808 nm to provide an output at about 980 nm from the three-level portion of said composite core.

20. A system as in claim 19 further including means for favoring the 940 nm emission from the four-level laser portion of said composite core, means for favoring the 980 nm emission from the three-level portion of said composite core, and means for suppressing emissions therefrom having wavelengths greater than about 1000 nm.

21. A cladding-pumped laser comprising a composite single-mode optical fiber core having a center region doped with a first type of rare-earth ions and an outer region doped with a second type of rare-earth ions, said core having an index of refraction n1, a multimode cladding, having an index of refraction n2, surrounding said single-mode core, an additional cladding, having an index of refraction n3, surrounding said multimode cladding, wherein n1>n2>n3, means associated with the center region of said core for favoring laser emission from said center region in a three-level mode of operation at a first characteristic wavelength when said center region is pumped at a second characteristic wavelength, means associated with the outer region of said core for favoring laser emission from said outer region in a four-level mode of operation at said second wavelength when said outer region is pumped at a third characteristic wavelength, and means for applying a high-power multimode signal to said multimode cladding to pump said outer region of said core at said third wavelength to cause said outer region to lase at said second wavelength and thereby apply a pumping signal to the adjacent center region of said core to cause the center region to provide a laser emission at said first wavelength.

22. A laser as in claim 21 wherein said first type of rare-earth ions comprises $Yb^{3+}$ ions and said second type of rare-earth ions comprises $Nd^{3+}$ ions.

* * * * *